(12) United States Patent
Strijker

(10) Patent No.: US 10,396,677 B2
(45) Date of Patent: Aug. 27, 2019

(54) FORWARD FED BOOST CONVERTER FOR FLYBACK SWITCHED MODE POWER SUPPLY AND METHOD THEREOF

(71) Applicant: NXP B.V., Eindhoven (NL)

(72) Inventor: Joan Wichard Strijker, Wijchen (NE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/873,412

(22) Filed: Jan. 17, 2018

(65) Prior Publication Data

US 2019/0222138 A1 Jul. 18, 2019

(51) Int. Cl.
| | |
|---|---|
| H02M 7/00 | (2006.01) |
| H02M 7/06 | (2006.01) |
| H02J 7/02 | (2016.01) |
| H02M 1/36 | (2007.01) |
| H02M 1/00 | (2006.01) |

(52) U.S. Cl.
CPC ............. *H02M 7/068* (2013.01); *H02J 7/022* (2013.01); *H02M 1/36* (2013.01); *H02M 7/064* (2013.01); *H02M 2001/0006* (2013.01)

(58) Field of Classification Search
CPC ......... H02M 3/33507; H02M 3/33515; H02M 3/33576; H02M 3/33592; H02M 3/33523
See application file for complete search history.

(56) References Cited

U.S. PATENT DOCUMENTS

| | | | |
|---|---|---|---|
| 8,008,898 B2 | 8/2011 | Melanson et al. | |
| 8,045,348 B2 * | 10/2011 | Zhu | H02M 1/36 363/18 |
| 9,712,045 B2 | 7/2017 | Mao et al. | |
| 9,762,131 B1 | 9/2017 | Wang et al. | |
| 2002/0114172 A1 | 8/2002 | Webb et al. | |
| 2015/0160270 A1* | 6/2015 | Shi | G01R 19/0084 363/21.13 |
| 2016/0056703 A1 | 2/2016 | Deboy et al. | |
| 2017/0176919 A1 | 6/2017 | Asano et al. | |

FOREIGN PATENT DOCUMENTS

| | | |
|---|---|---|
| CN | 201378799 Y | 1/2010 |
| CN | 204425174 U | 6/2015 |
| WO | WO-2011/008426 A1 | 1/2011 |

OTHER PUBLICATIONS

Zhang, Taizhi et al; "Analysis on Ringing Effect of Auxiliary Winding in Primary Side Regulated Flyback Converter"; IEEE Energy Conversion Congress and Exposition; pp. 2727-2733 (2014) (Year: 2014).*

Choi, Hang-Seok et al; "Techniques to minimize Power Consumption of SMPS in Standby Mode"; IEEE 36 Power Electronics Specialists Conference; pp. 2817-2822 (2005).

TEA1401 datasheet.

TEA1401T Power plug for the universal mains; Preliminary Specifications; 20 pages (Mar. 7, 1997).

* cited by examiner

*Primary Examiner* — Adolf D Berhane
*Assistant Examiner* — Afework S Demisse

(57) ABSTRACT

Various embodiments relate to a flyback type SMPS including a primary side controller on a primary side, a first switch on the primary side and a transformer including a primary side winding on the primary side, a secondary side winding on a secondary side and an auxiliary winding on the primary side connected to a first switching regulator wherein the first switching regulator is supplied during a primary stroke from the auxiliary winding when the first switch is on.

17 Claims, 8 Drawing Sheets

FORWARD FED BOOST CONVERTER FOR FLYBACK SWITCHED MODE POWER SUPPLY AND METHOD THEREOF

TECHNICAL FIELD

This disclosure relates generally to switched mode power supply ("SMPS"), and more specifically, but not exclusively, to a forward fed boost converter for flyback SMPS.

BACKGROUND

SMPS is a known electronic power supply which uses switching regulators to convert electricity as efficiently as possible.

Therefore, in order to optimize the efficiency of SMPS, it is advantageous to supply the controller's integrated circuit ("IC") from a low voltage.

When supplying the controller's IC with a high voltage, an internal series regulator is required, which results in increased losses. Further, with an internal series regulator, dissipation inside the IC can become high.

SUMMARY OF EXEMPLARY EMBODIMENTS

A brief summary of various embodiments is presented below. Embodiments address the need to create a forward fed boost converter for flyback SMPS.

In order to overcome these and other shortcomings of the prior art and in light of the need to create a forward fed boost mode converter for flyback SMPS, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a flyback type switched mode power supply including a primary side controller on a primary side, a first switch on the primary side and a transformer including a primary side winding on the primary side, a secondary side winding on a secondary side, and an auxiliary winding on the primary side connected to a first switching regulator, wherein the first switching regulator is supplied during a primary stroke from the auxiliary winding when the first switch is on.

In an embodiment of the present disclosure, the flyback SMPS, further including the transformer, including a secondary auxiliary winding on the secondary side connected to a second switching regulator, wherein the second switching regulator is supplied during a primary stroke from the secondary auxiliary winding.

In an embodiment of the present disclosure, the flyback type SMPS, further including a startup resistor on the primary side connected to the first switching regulator.

In an embodiment of the present disclosure, the flyback type SMPS, further including second switch on the secondary side which is driven by the second switching regulator with an integrated synchronous rectifier controller.

In an embodiment of the present disclosure, the first switching regulator and the second switching regulator are a boost type regulator.

In an embodiment of the present disclosure, the boost type regulator includes a pulse width modulator regulator, a switch, a rectifying diode, an inductor, and an output capacitor.

In an embodiment of the present disclosure, the PWM regulator is configured to regulate an internal working voltage of the boost type regulator to a fixed voltage which is greater than or equal to an input voltage of the boost type regulator.

In an embodiment of the present disclosure, the source of the switch of the boost type regulator is grounded.

Various embodiments described herein relate to a method for supplying a controller using a flyback type switched mode power supply, the SMPS including a primary side controller on a primary side, a first switch on the primary side, a transformer including a primary side winding on the primary side, a secondary side winding on a secondary side and an auxiliary winding on the primary side connected to a first switching regulator, the method including the steps of turning on the first switch and supplying the first switching regulator during a primary stroke from an auxiliary winding.

In an embodiment of the present disclosure, the method for supplying a controller using a flyback type SMPS, the SMPS including the transformer, including a secondary auxiliary winding on the secondary side connected to a second switching regulator, the method further including supplying the second switching regulator during a primary stroke from the secondary auxiliary winding.

In an embodiment of the present disclosure, the method for supplying a controller using a flyback type SMPS, further including connecting a startup resistor on the primary side to the first switching regulator.

In an embodiment of the present disclosure, the method for supplying a controller using a flyback type SMPS, further including driving a second switch on the secondary side by the second switching regulator with an integrated synchronous rectifier controller.

In an embodiment of the present disclosure, the first switching regulator and the second switching regulator are a boost type regulator.

In an embodiment of the present disclosure, the boost type regulator includes a pulse width modulator regulator, a switch, a rectifying diode, an inductor, and an output capacitor.

In an embodiment of the present disclosure, the PWM regulator is configured to regulate an internal working voltage of the boost type regulator to a fixed voltage which is greater than or equal to an input voltage of the boost type regulator.

In an embodiment of the present disclosure, the source of the switch of the boost type regulator is grounded.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
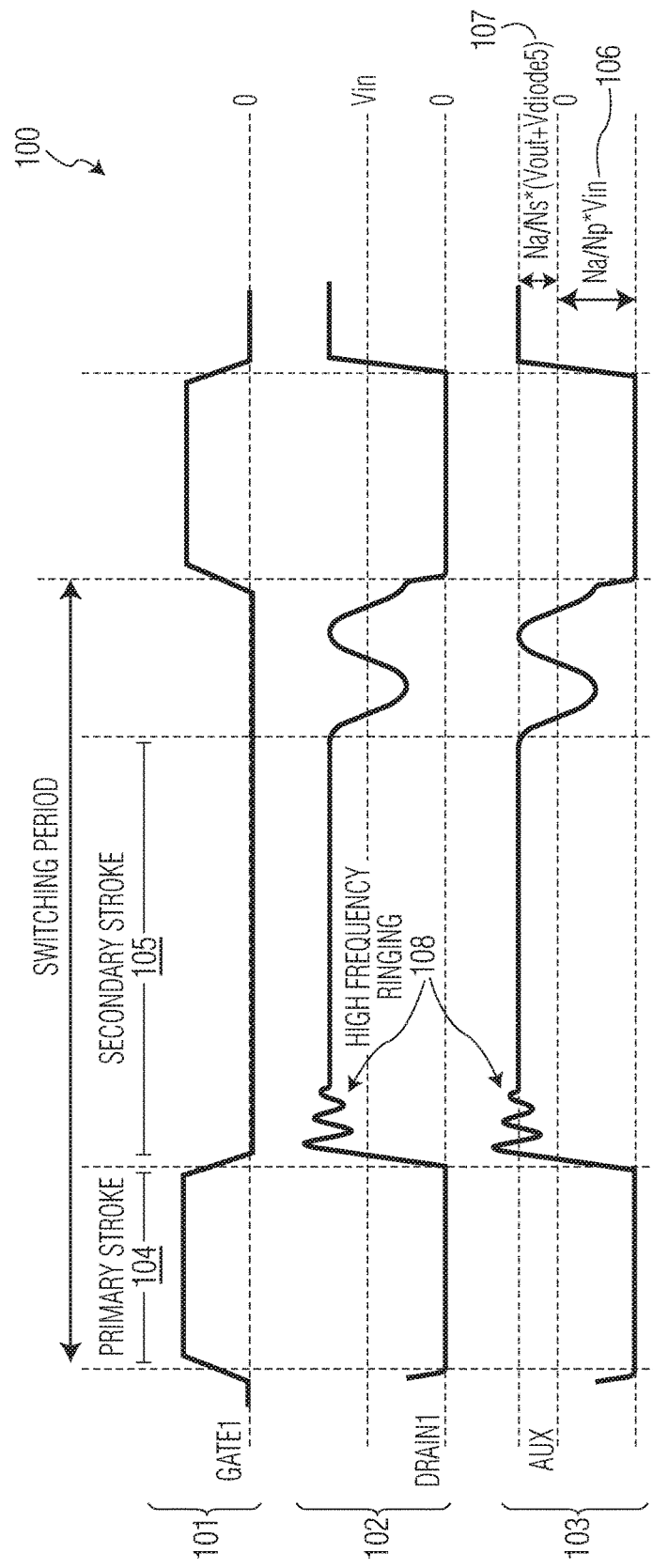
FIG. 1 illustrates a timing diagram for a flyback SMPS for smart charging applications.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

An isolated flyback SMPS for a smart charging application includes alternating current ("AC") mains power on the primary side which supplies the circuit. The AC mains are connected by bridge rectifier diodes to an input capacitor.

The primary side of the circuit includes an SMPS controller IC which drives a MOSFET switch and via a transformer, the energy is transferred to an output capacitor.

The output voltage is controlled by a controller IC on the secondary side via a signal transformer. The output voltage setting is typically set by the smart phone or tablet by USB connections.

The input side and the output side are electrically isolated by both transformers on the primary side and the secondary side of the circuit.

The controller IC on the primary side is supplied by the auxiliary winding of the transformer.

The internal working voltage of the controller IC on the primary side is generated by the internal series regulator.

FIG. 1 illustrates a timing diagram 100 for a flyback SMPS for smart charging applications.

The timing diagram 100 includes separate timing diagrams for gate1 101, drain1 102 and auxiliary 103.

In the flyback converter, the input switch is switched on and when it is switched on energy is stored in transformer T1 during the primary stroke 104.

During the secondary stroke 105, the energy is released to the secondary side by a rectifier diode. Further, during the secondary stroke 105, energy is also fed into a $V_{cc}$ capacitor by the auxiliary winding with a rectifier diode.

The voltage across the auxiliary winding 103 during the primary stroke 104 is equal to equation 106 which is: $N_a/N_p*V_{in}$. $N_p$ is defined as the number of turns of the primary transformer winding. $N_a$ is defined as the number of turns of the auxiliary transformer winding. $V_{in}$ is defined as the input voltage.

The voltage across the auxiliary transformer winding 103 during the secondary stroke 105 is equal to equation 107 which is: $N_a/N_s*(V_{out}+V_{diode6})$. $N_s$ is defined as the number of turns of the secondary transformer winding. $V_{out}$ is defined as the output voltage. $V_{diode6}$ is defined as the forward voltage of diode D6.

The auxiliary transformer winding voltage during the secondary stroke 105 is used to supply the primary side controller IC. Therefore the voltage of the $V_{cc}$ capacitor is equal to $N_a/N_s*(V_{out}+V_{diode6})-V_{diode5}$ in which $V_{diode5}$ is defined as the forward voltage of diode D5.

Since $V_{cc}=N_a/N_s*(V_{out}+V_{diode6})-V_{diode5}$, a change in the output voltage will also change the $V_{cc}$ voltage. For the minimum output voltage setting, $V_{cc}$ must be high enough to supply the primary side controller IC. For the maximum output voltage setting, $V_{cc}$ will become much higher than needed, resulting in additional losses inside the controller IC.

For example, a USB type C smart charger adapter supports an approximate output voltage range of between 3V to 20V.

If the minimum $V_{cc}$ voltage for the primary side controller IC and for the diode D5 is 10V, then the forward voltage of diode D6 is 0.7V then $N_a/N_s=(10+0.7)/(3+0.7)=2.89$.

At $V_{out}=20V$, $V_{cc}=N_a/N_s*(V_{out}+V_{diode6})-V_{diode5}=59V$.

Therefore, the $V_{cc}$ voltage is much higher than required, and most of the energy to power the primary side controller IC is dissipated in the required internal series regulator.

If the internal series regulator regulates to the minimum required voltage of 10V, then at $V_{out}=20V$, approximately 83% of the energy supplying the primary side controller IC is dissipated in the internal series regulator. Furthermore, the $V_{cc}$ voltage will increase at higher output loads because the peak of the high frequency ringing voltage 108 on the auxiliary winding 103 which will charge the $V_{cc}$ capacitor to an even higher voltage.

The high frequency ringing voltage 108 is caused by the leakage inductance of the transformer. The $V_{cc}$ voltage can rise up to an additional 50%. Therefore, the highest $V_{cc}$ voltage may be 59V+50%=88V.

In normal operation, the power for the primary side supply is low (only up to approximately 2% of the output power), but, this dissipation in the primary side controller IC can become too high to keep the primary side controller IC below its maximum operating temperature.

Further, in high power density chargers, with a total efficiency from input to output of over 90%, approximately 2% loss is significant (i.e., 90% efficiency means 10% losses. 2% loss to power the primary side IC is a significant part of the 10%). Therefore, to limit the $V_{cc}$ supply voltage range, it is advantageous to not supply to the primary side IC during the secondary stroke, but during the primary stroke (i.e., forward fed).

Figure 2:
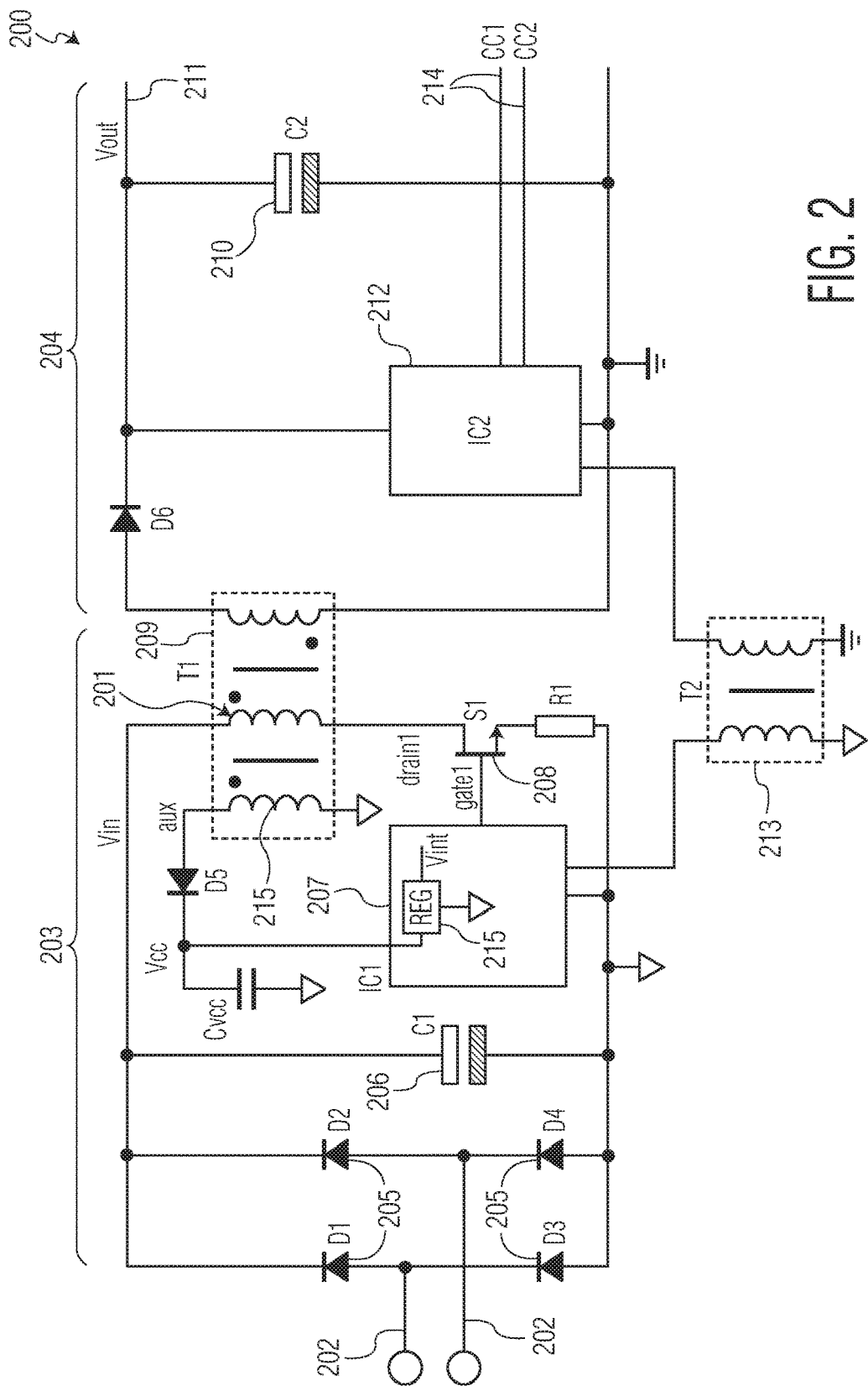
FIG. 2 illustrates a circuit diagram for a flyback SMPS for charging applications with forward supply of the primary side.

FIG. 2 illustrates a circuit diagram 200 for a flyback SMPS for charging applications with forward supply of the primary side.

An isolated flyback SMPS for a smart charging application includes alternating current ("AC") mains power 202 on the primary side 203 which supplies the circuit 200. The AC mains 202 are connected by bridge rectifier diodes 205 to an input capacitor 206.

The primary side 203 includes a primary side controller IC 207 which drives a MOSFET switch 208 and via a transformer 209, the energy is transferred to an output capacitor 210. The output voltage 211 is controlled by a secondary side controller IC 212 on the secondary side 204 via a signal transformer 213. The output voltage 211 setting is typically set by the smart phone or tablet by USB connections 214.

The input side and the output side are electrically isolated by transformers 209 on the primary side 203 and by transformer 213 on the secondary side 204. The primary side controller IC 207 on the primary side 203 is supplied by the auxiliary winding 201 of the transformer 209.

The internal working voltage of the IC 207 on the primary side 203 is generated by the internal series regulator 215.

In FIG. 2, the polarity of the auxiliary winding 215 is reversed.

Figure 3:
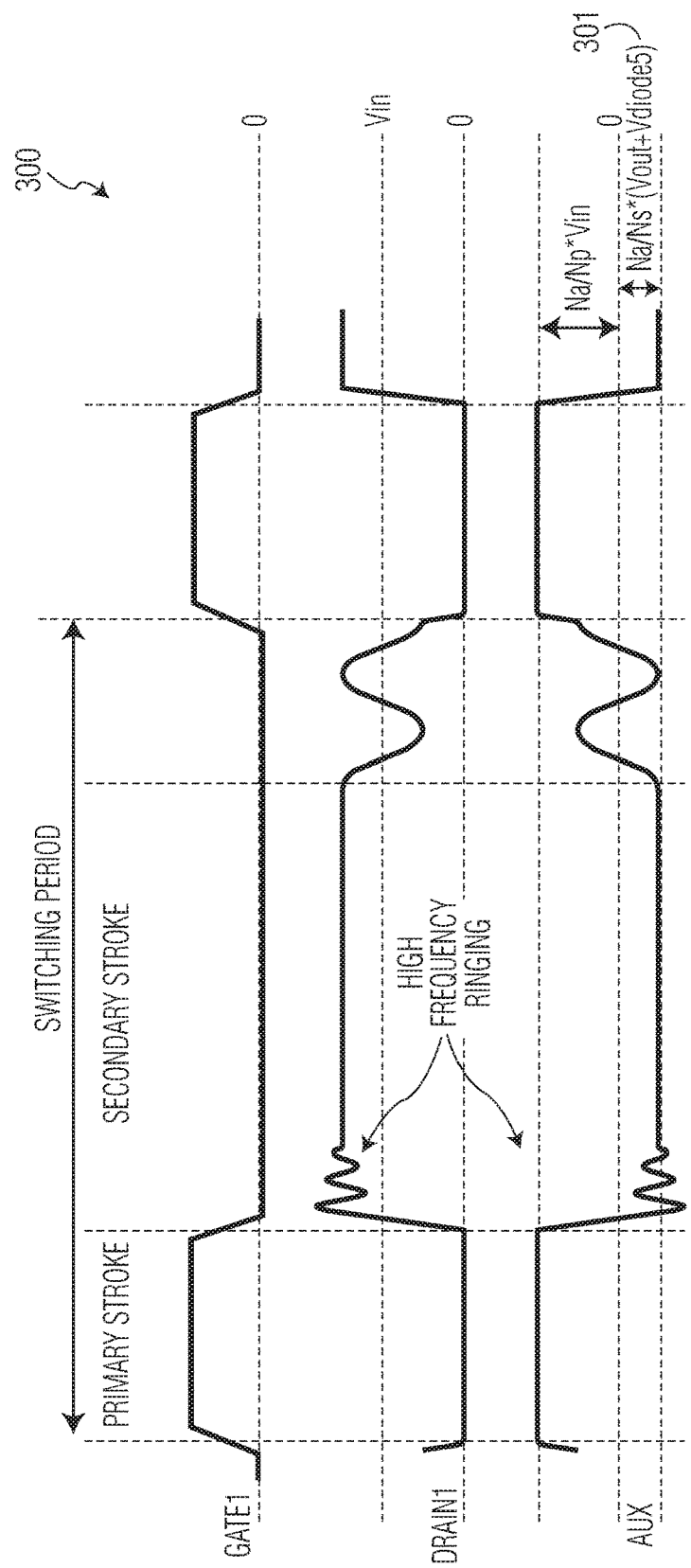
FIG. 3 illustrates a timing diagram for the flyback SMPS for charging applications with forward supply of the primary side of FIG. 2.

FIG. 3 illustrates a timing diagram 300 for the flyback SMPS for charging applications with forward supply of the primary side of FIG. 2.

The $V_{cc}$ voltage is now equal to equation 301 which is defined as $N_d/N_p*V_{in}-V_{diode5}$.

For a universal mains input adapter, the input voltage range is approximately 85 Vac to 264 Vac. Therefore, the rectified mains peak voltage is equal to $\sqrt{2}*85$ to $\sqrt{2}*264$ which is approximately 120V to 373V.

During operation of the universal mains input adapter, there will be a 120 Hz ripple (with 60 Hz mains) on the capacitor on the primary side. During maximum load conditions, the lowest voltage on the capacitor on the primary side may be approximately 70V.

For a minimum of 10V for $V_{cc}$, $N_d/N_p$ is calculated at the lowest input voltage (10+0.7)/70=0.15. For the maximum input voltage: $V_{cc}=N_d/N_p*V_{in}-V_{diode5}$=56V.

If the primary stroke supply is used, there is approximately no effect of peak rectification. The losses in the internal series regulator will be lower as the maximum voltage has dropped from 88V to 56V.

To lower the losses of the supply regulator, a SMPS may be used to generate the internal working voltage, meaning that linear regulator is replaced by a switching regulator. The switching regulator may be a buck topology or a boost topology. Other topologies, like buck-boost, switched capacitor or any other topologies may also be possible.

Figure 4:
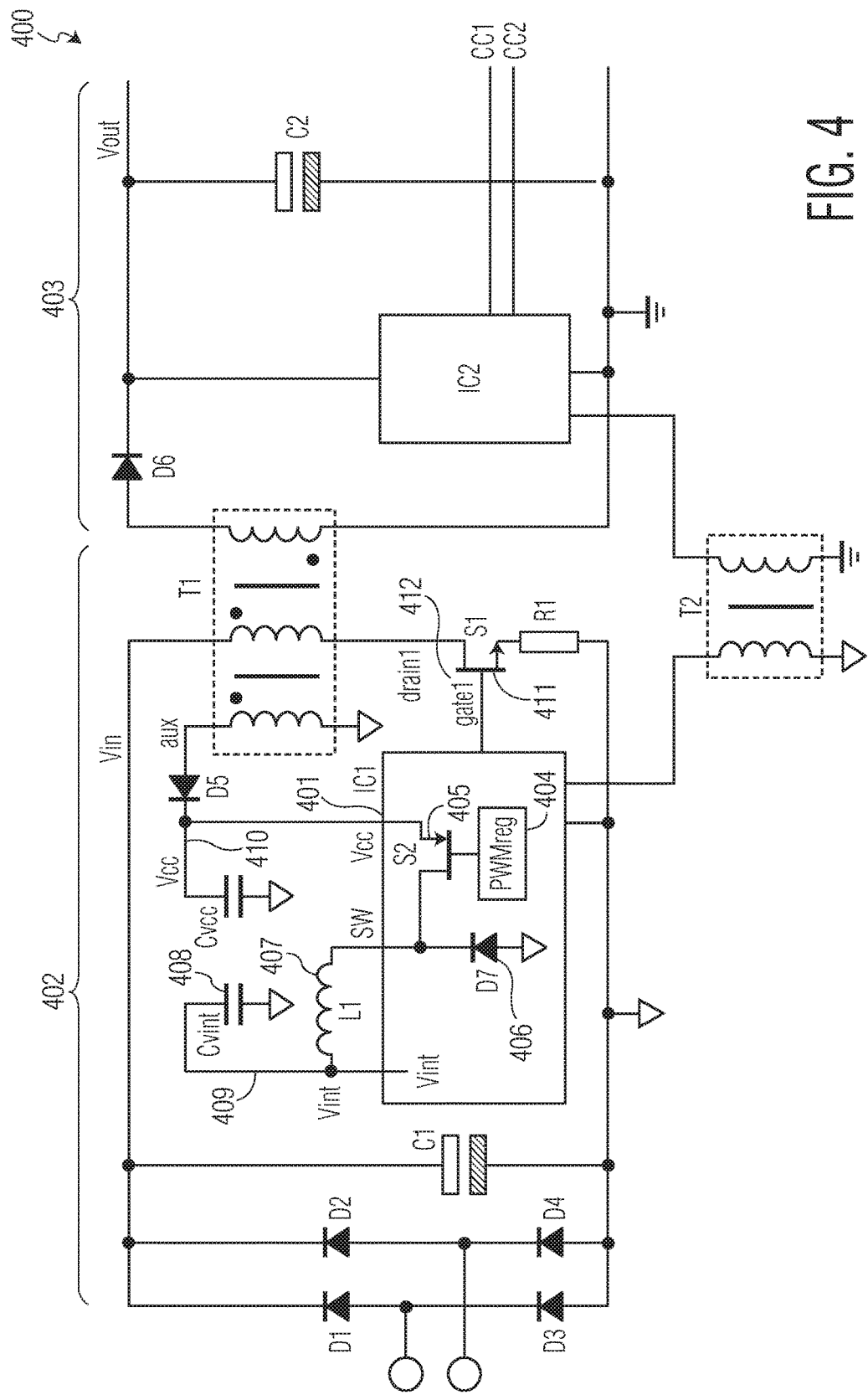
FIG. 4 illustrates a circuit diagram of the current embodiment for smart charger applications with a buck type SMPS for the primary side supply.

FIG. 4 illustrates a circuit diagram 400 of the current embodiment for smart charger applications with a buck type SMPS for the primary side supply.

A buck type switching regulator is integrated in the primary side controller IC 401 of the primary side 402.

The buck type switching regulator includes a PWM regulator 404, a switch 405, a rectifying diode 406, an inductor 407, and an output capacitor 408.

The PWM regulator 404 regulates $V_{int}$ 409 to a voltage which is lower or equal to the input voltage $V_{cc}$ 410. The $V_{int}$ 409 voltage can be a fixed voltage or can be dependent on the operational condition. At low loads, the driving voltage for switch 411 and gate1 412 may be lower because the peak current through switch 411 is lower at low loads. Therefore, at low loads, $V_{int}$ 409 may be regulated to a lower voltage.

In the current embodiment, a boost type SMPS is advantageous over buck type SMPS.

An example of this advantage of boost type over buck type is that the boost type SMPS only requires one additional IC pin (i.e., pin SW). In contrast, the buck type SMPS requires both one additional IC pin and an additional $V_{cc}$ pin on the IC. A low pin count is advantageous for SMPS.

Another example of this advantage of boost type over buck type is that the maximum internal IC voltage is equal to $V_{int}+V_{diode7}$ (see FIG. 4). Because the maximum voltage for small feature size IC processes is limited, the maximum internal IC voltage being equal is advantageous.

For the buck type SMPS, for example, $V_{cc}$ must be at least the minimum required $V_{int}$ voltage. Therefore, if 10V minimum is needed, the maximum $V_{cc}$ will be 56V, if $V_{cc}$ is supplied during the primary stroke at $V_{in}$=373V.

For the boost type SMPS, for example, the maximum $V_{cc}$ voltage is $V_{int}+V_{diode7}$=10.7$V_{cc}$ Therefore, for $V_{cc}$=$N_d/N_p*V_{in}-V_{diode5}$=10.7V at $V_{in}$=373V then $N_d/N_p$=0.03. The minimum $V_{cc}$ voltage will be $V_{cc}=N_d/N_p*V_{in}-V_{diode5}$=1.4V at $V_{in}$=70V. Therefore, for the boost type SMPS, from a 70V to 373V $V_{in}$ voltage, a $V_{cc}$ voltage between 1.4V and 10.7V is created and a fixed $V_{int}$ voltage of 10V is created, which is suitable for high density IC processes.

Another example of this advantage of boost type over buck type is that switch S2 (see FIG. 6) is ground connected and is therefore easier to drive as compared to switch S2 405 (see FIG. 4) which is connected to $V_{cc}$ which is a high voltage.

As illustrated, by using the current embodiment, the losses for the primary side supply are reduced by a factor of approximately three. Furthermore, the maximum voltage on the IC is reduced from 88V to 10.7V The total efficiency of the smart charger improves and the dissipation in the primary side IC is reduced significantly allowing a more high-power density charger and a smaller primary side IC package.

Figure 5:
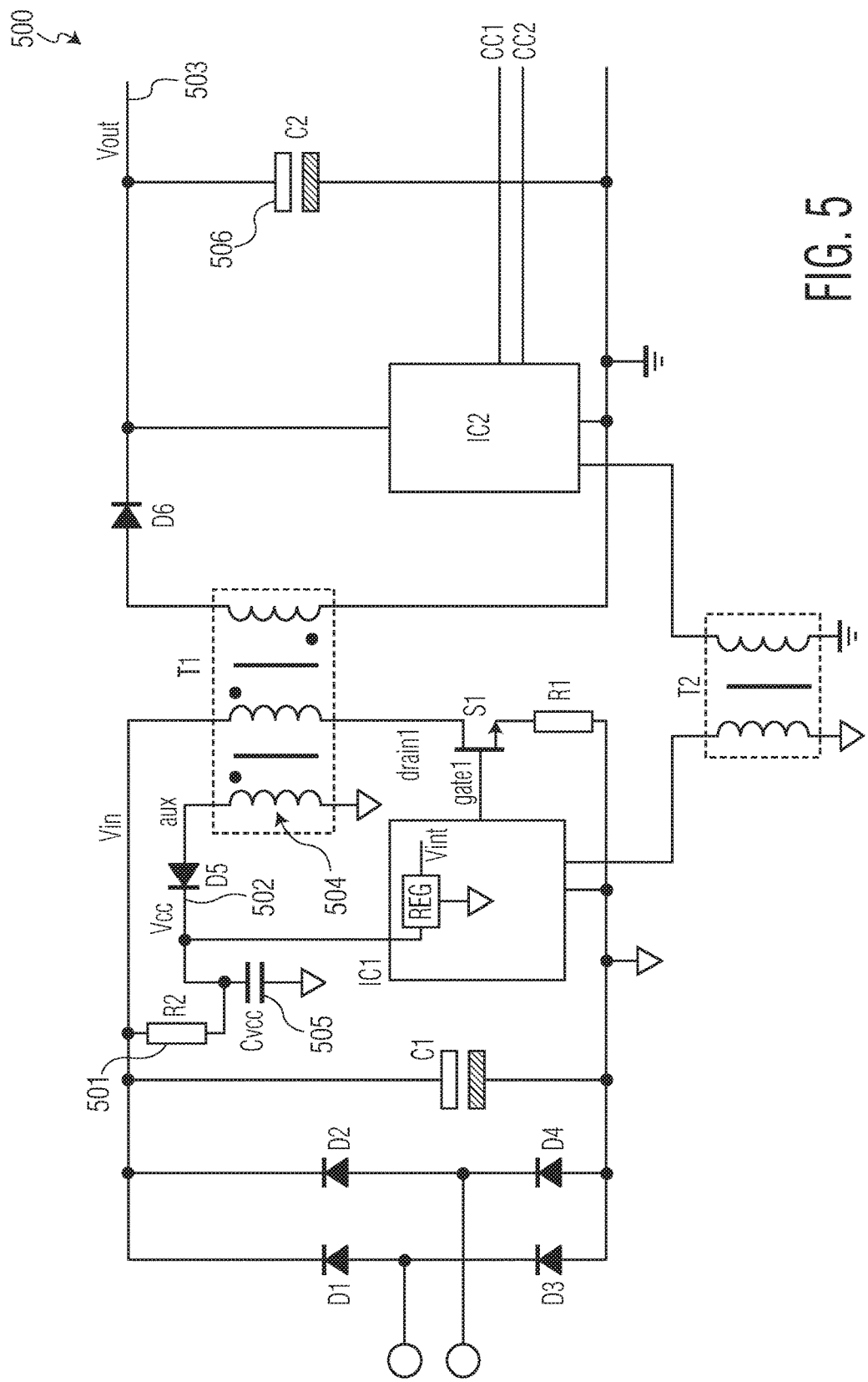
FIG. 5 illustrates a circuit diagram of a smart charger application with a start-up resistor.

FIG. 5 illustrates a circuit diagram 500 of a smart charger application with a start-up resistor.

FIG. 5 is a circuit diagram 500 which includes a start-up resistor R2 501. If no high voltage start-up circuit is present inside the IC, the start-up is performed with an external (high ohm) resistor.

A high voltage start-up circuit allows for fast start-up and low standby power of the charger, however, requires a high voltage IC process, which adds a cost and therefore, a high voltage process is not preferred.

To initially start-up the primary side IC, $V_{cc}$ 502 is charged to a start-up voltage several volts above the minimum supply voltage. (e.g., $V_{cc}$ 502 is charged to 15V if the minimum supply voltage is 10V). When the smart charger starts switching, $V_{out}$ 503 is initially zero, so the voltage $N_d/N_s*(V_{out}+V_{diode6})-V_{diode5}$ will be approximately zero.

Therefore, $V_{cc}$ 502 is initially not supplied from the auxiliary winding 504. Only when the $V_{out}$ 503 reaches a minimum level, then $V_{cc}$ 502 supply is taken over by the auxiliary winding 504.

Until $V_{out}$ 503 has risen to the minimum level, the supply current is drawn from the $V_{cc}$ 502 capacitor $C_{Vcc}$ 505. The Vcc capacitor, $C_{Vcc}$ 505 needs to be several micro farads to supply the $V_{cc}$ 502 for the time during which $V_{out}$ 503 has not reached its minimum level. To charge the output capacitor C2 506 to the minimum output voltage level, when the charger is starting, is approximately several milliseconds.

When the $V_{cc}$ capacitor, $C_{Vcc}$ 505 is several micro farads and the start-up resistor R2 501 is approximately several mega-ohms, it may take up to a second before the $V_{cc}$ 502 voltage has reached its start-up voltage of $15V_{cc}$. Therefore, after the smart charger is plugged into the mains, it may take up to a second before the smart charger starts begins to operate.

Figure 6:
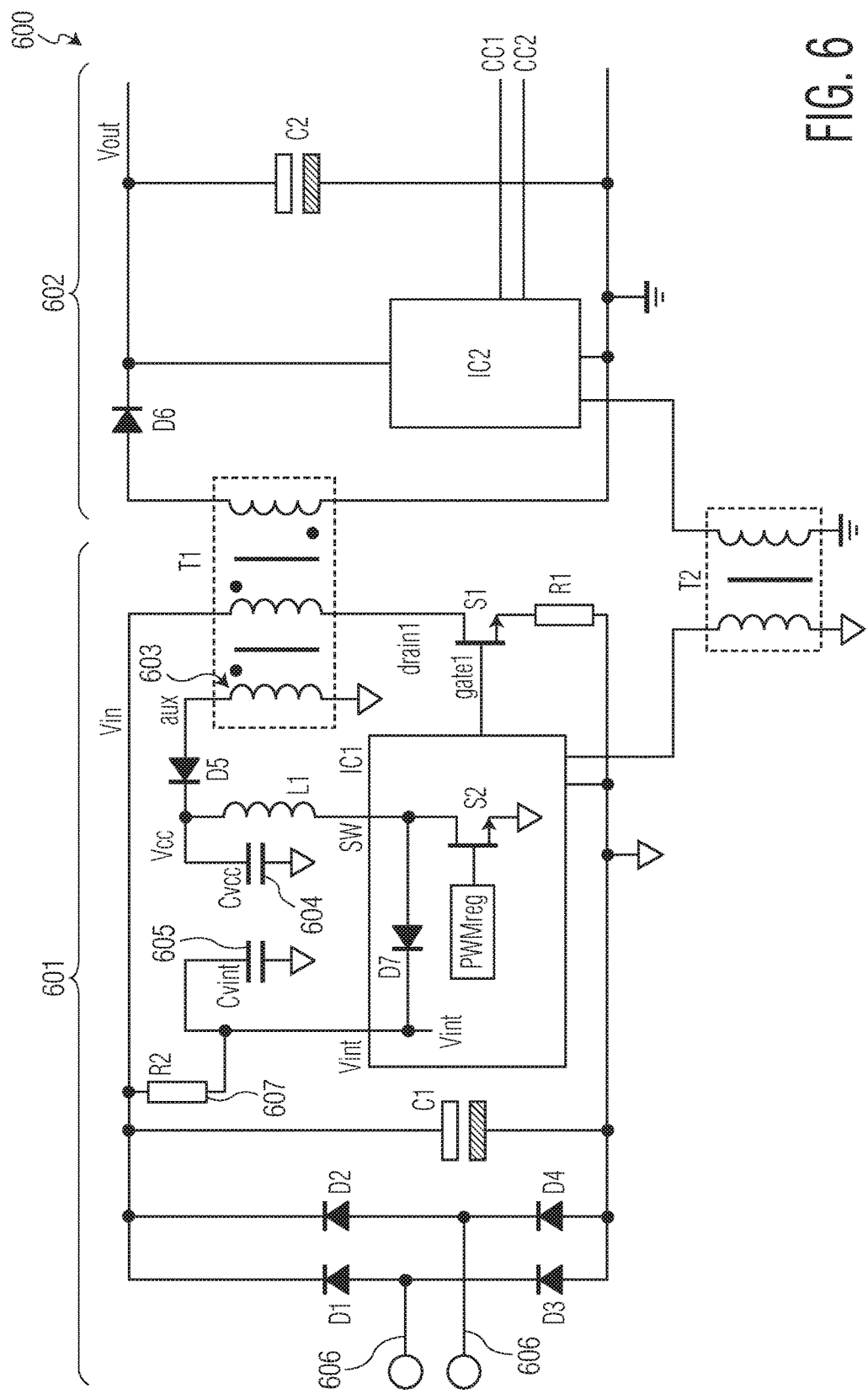
FIG. 6 illustrates a circuit diagram of the current embodiment for smart charger applications with a start-up resistor and a primary stroke supply with a boost type SMPS.

FIG. 6 illustrates a circuit diagram 600 of the current embodiment for smart charger applications with a start-up resistor and a primary stroke supply with a boost type SMPS.

In the current embodiment, because the primary side 601 is supplied during the primary stroke, the supply from the auxiliary winding 603 takes over the supply at the first switching cycle.

$C_{Vcc}$ 604 is charged to $N_a/N_p*V_{in}-V_{diode5}$. The $C_{Vint}$ 605 capacitor may be a small value (e.g., 100 nF). Because of the low value of capacitor $C_{Vint}$ 605, the start-up after plugging the smart charger into the AC mains 606 occurs nearly immediately. (i.e. less than 100 milliseconds).

If the maximum allowed start-up time is approximately one second (this is a typical value for charger applications), R2 607 may also be a larger value. (e.g., 20 mega-ohms instead of 2 mega-ohms). The larger value for R2 607 may lower the losses during standby operation of the smart charger.

At 230V at the AC mains 606, the losses in a 2 mega-ohm resistor are approximately $(230*\sqrt{2})^2/2$ meg=53 milliwatt. For a 20 mega-ohm resistor, these losses may be reduced to 5 milliwatt. Therefore, to optimize the efficiency of the supply on the secondary side a similar concept may be employed.

Figure 7:
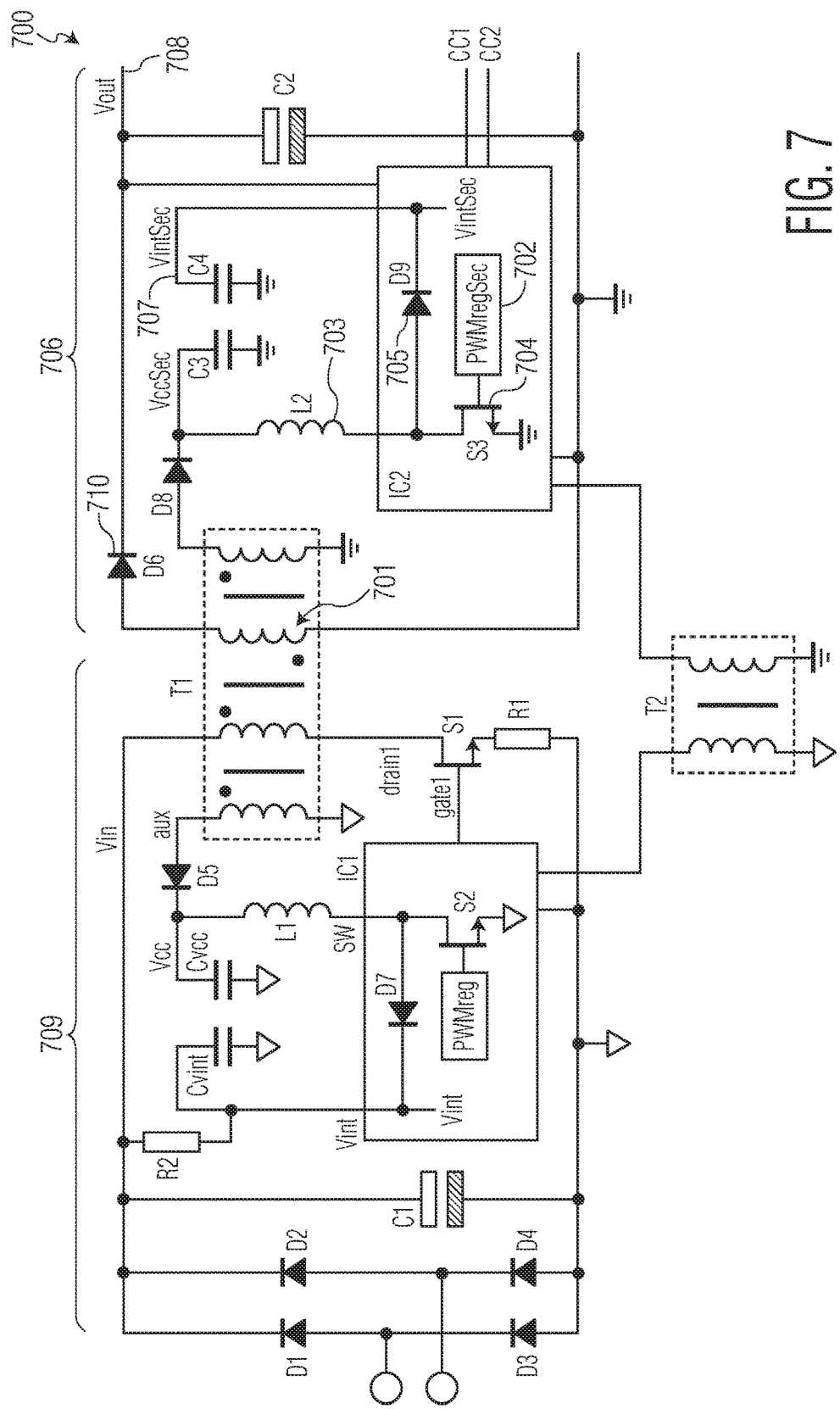
FIG. 7 illustrates a circuit diagram of the current embodiment with a primary stroke supply with boost type SMPS on the primary side and the secondary side.

FIG. 7 illustrates a circuit diagram 700 of the current embodiment with a primary stroke supply with boost type SMPS on the primary side and the secondary side.

In FIG. 7, an additional secondary auxiliary winding 701 is included and a boost converter which includes a PWM-regSec 702, inductor L2 703, switch S3 704 and diode D9 705 is included on the secondary side 706.

The secondary side 706 supplies from $V_{int}Sec$ 707. The $V_{out}$ 708 connection is used to measure and control the output voltage, $V_{out}$ 708. Because the maximum output voltage on the secondary side 706 is lower than the maximum output voltage on the primary side 709, the efficiency advantage is less than for the primary side.

Figure 8:
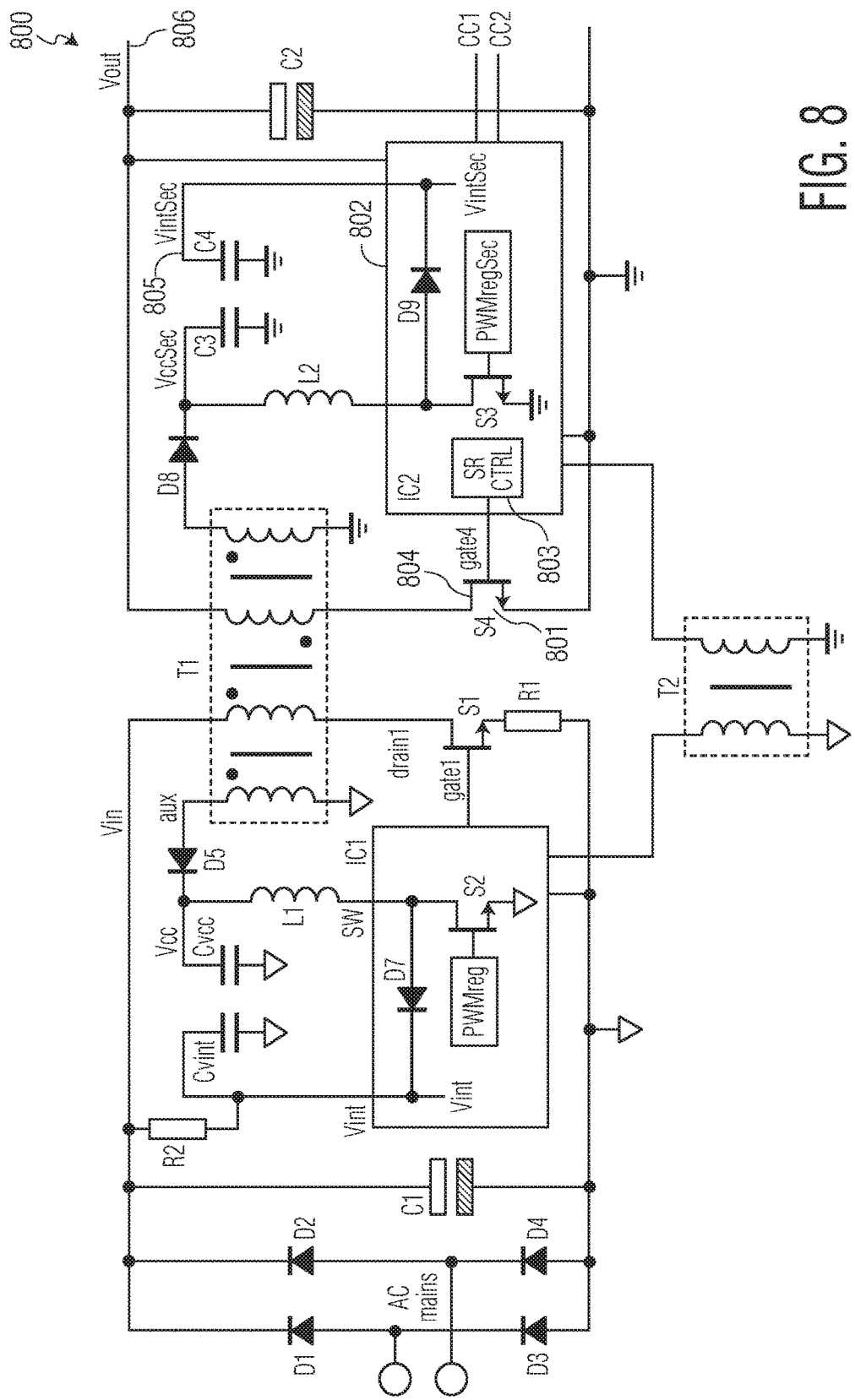
FIG. 8 illustrates a circuit diagram of the current embodiment for smart charger application with primary stroke supply with a boost type SMPS on the primary side and the secondary side with synchronous rectification.

FIG. 8 illustrates a circuit diagram 800 of the current embodiment for smart charger application with primary stroke supply with a boost type SMPS on the primary side and the secondary side with synchronous rectification.

In FIG. 8, the rectifier diode D6 710 (see FIG. 7, not shown in FIG. 8) is replaced by a synchronous rectifier switch S4 801. Switch S4 801 is driven by the secondary side controller IC, IC2 802, with an integrated synchronous rectifier controller, SRctrl 803.

At the lowest output voltage of the smart charger (i.e. 3V), switch S4 801 would not be driven to a lowest on-state resistance, if only 3V was supplied to gate4 804. With the boost converter from the current embodiment, $V_{int}Sec$ 805 may be regulated to a voltage for driving switch S4 801 to a lowest on-state resistance.

At the highest output voltage of the smart charger (i.e. 20V), the gate4 804 may be driven with an optimal voltage when the boost converter from the current embodiment is added. Without the boost converter, an integrated linear regulator is needed to lower the 20V output voltage to a voltage to drive switch S4 801. (e.g., 5V to 8V).

The integrated linear regulator would increase power dissipated in IC2 802 and with the boost regulator, the $V_{int}Sec$ 805 voltage may be regulated to a constant voltage for driving the synchronous rectifier switch S4 801, independent of the output voltage $V_{out}$ 806.

By implementing the current embodiment, the losses inside the primary side and secondary side IC controllers are approximately a factor of six lower, the maximum IC voltages are a factor of eight lower and standby power losses are a factor of two lower. Further, the total efficiency of the smart charger may be improved up to approximately 0.15%.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A flyback type switched mode power supply (SMPS) circuit, comprising:
   a primary side controller configured to be coupled to a primary side of a transformer; wherein the primary side controller includes a first switching power regulator; a first switch on the primary side; and wherein the transformer includes a primary side winding on the primary side, a secondary side winding on a secondary side, and an auxiliary winding on the primary side; wherein the first switching regulator is configured to be coupled to the auxiliary winding, wherein the first switching regulator is configured to be supplied with power during a primary stroke from the auxiliary winding when the first switch is on; and wherein the transformer includes a secondary auxiliary winding on the secondary side; further comprising a second switching power regulator configured to be coupled to the secondary auxiliary winding, wherein the second switching regulator is supplied during a primary stroke from the secondary auxiliary winding.

2. The flyback type SMPS circuit of claim 1, further comprising: a startup resistor on the primary side connected to the first switching regulator.

3. The flyback type SMPS circuit of claim 1, further comprising: a second switch on the secondary side which is driven by the second switching regulator with an integrated synchronous rectifier controller.

4. The flyback type SMPS circuit of claim 1, wherein the boost type regulator includes a pulse width modulator (PWM) regulator, a switch, a rectifying diode, an inductor, and an output capacitor.

5. The flyback type SMPS circuit of claim 4, wherein the PWM regulator is configured to regulate an internal working voltage of the boost type regulator to a fixed voltage which is greater than or equal to an input voltage of the boost type regulator.

6. The flyback type SMPS circuit of claim 5, wherein the source of the switch of the boost type regulator is grounded.

7. The flyback type SMPS circuit of claim 1: wherein the first switching regulator is a buck type switching regulator.

8. The flyback type SMPS of claim 1, wherein the first switching regulator and the second switching regulator area boost type regulator.

9. A method for supplying a controller using a flyback type switched mode power supply (SMPS), the SMPS including a primary side controller on a primary side, wherein the primary side controller includes a first switching power regulator, a first switch on the primary side, a transformer including a primary side winding on the primary side, a secondary side winding on a secondary side and an auxiliary winding on the primary side connected to the first switching regulator, the method comprising the steps of: turning on the first switch, and supplying the first switching regulator during a primary stroke from an auxiliary windings; wherein the SMPS includes the transformer, including a secondary auxiliary winding on the secondary side connected to a second switching regulator, the method further comprising: supplying the second switching regulator during a primary stroke from the secondary auxiliary winding.

10. The method for supplying a controller using a flyback type SMPS of claim 9, further comprising: connecting a startup resistor on the primary side to the first switching regulator.

11. The method for supplying a controller using a flyback type SMPS of claim 9, further comprising: driving a second switch on the secondary side by the second switching regulator with an integrated synchronous rectifier controller.

12. The method for supplying a controller using a flyback type SMPS of claim 9, wherein the first switching regulator and the second switching regulator area boost type regulator.

13. The method for supplying a controller using a flyback type SMPS of claim 12, wherein the boost type regulator includes a pulse width modulator ("PWM") regulator, a switch, a rectifying diode, an inductor, and an output capacitor.

14. The method for supplying a controller using a flyback type SMPS of claim 13, wherein the PWM regulator is configured to regulate an internal working voltage of the boost type regulator to a fixed voltage which is greater than or equal to an input voltage of the boost type regulator.

15. The method for supplying a controller using a flyback type SMPS of claim 14, wherein the source of the switch of the boost type regulator is grounded.

16. A flyback type switched mode power supply ("SMPS") comprising: a primary side controller on a primary side; a first switch on the primary side; and a transformer including a primary side winding on the primary side, a secondary side winding on a secondary side, and an auxiliary winding on the primary side connected to a first switching regulator; wherein the first switching regulator is supplied during a primary stroke from the auxiliary winding when the first switch is on, the transformer, including a secondary auxiliary winding on the secondary side connected to a second switching regulator; wherein the second switching regulator is supplied during a primary stroke from the secondary auxiliary winding.

17. A method for supplying a controller using a flyback type switched mode power supply ("SMPS"), the SMPS including a primary side controller on a primary side, a first switch on the primary side, a transformer including a primary side winding on the primary side, a secondary side winding on a secondary side and an auxiliary winding on the primary side connected to a first switching regulator, the method comprising the steps of: turning on the first switch, and supplying the first switching regulator during a primary stroke from an auxiliary winding; the SMPS including the transformer, including a secondary auxiliary winding on the secondary side connected to a second switching regulator, the method further comprising: supplying the second switching regulator during a primary stroke from the secondary auxiliary winding.

* * * * *